(12) United States Patent
Fountain et al.

(10) Patent No.: US 12,357,009 B2
(45) Date of Patent: Jul. 15, 2025

(54) METHODS FOR INHIBITING MATERIAL MIXING IN A MATERIAL PROCESSING SYSTEM

(71) Applicant: Tropicana Products, Inc., Bradenton, FL (US)

(72) Inventors: Gerald Olean Fountain, Wilmette, IL (US); Johnny Casasnovas, Barrington, IL (US); Teodoro Rivera, Algonquin, IL (US); John Bovastro, Barrington, IL (US)

(73) Assignee: Tropicana Products, Inc., Bradenton, FL (US)

( * ) Notice: Subject to any disclaimer, the term of this patent is extended or adjusted under 35 U.S.C. 154(b) by 22 days.

(21) Appl. No.: 18/417,777

(22) Filed: Jan. 19, 2024

(65) Prior Publication Data

US 2024/0148035 A1 May 9, 2024

Related U.S. Application Data

(62) Division of application No. 17/154,436, filed on Jan. 21, 2021, now abandoned.

(51) Int. Cl.
*A23L 19/00* (2016.01)
*A23L 29/00* (2016.01)
(Continued)

(52) U.S. Cl.
CPC .............. *A23L 19/09* (2016.08); *A23L 29/035* (2016.08); *A23L 29/238* (2016.08);
(Continued)

(58) Field of Classification Search
CPC ........ A23L 19/09; A23L 29/27; A23L 29/035; A23L 29/262; A23L 29/244;
(Continued)

(56) References Cited

U.S. PATENT DOCUMENTS

| 2,839,768 A | 6/1958 | Suchecki |
| 3,135,278 A | 6/1964 | Foord et al. |

(Continued)

FOREIGN PATENT DOCUMENTS

| CN | 1533827 | 10/2004 |
| CN | 207446892 U | 6/2018 |

(Continued)

OTHER PUBLICATIONS

International Preliminary Report on Patentability issued on Jul. 20, 2023, in PCT/US2021/065328.
(Continued)

*Primary Examiner* — P. Macade Nichols
(74) *Attorney, Agent, or Firm* — Barnes & Thornburg LLP; G. Peter Nichols

(57) ABSTRACT

A method is described for minimizing material mixing of a first fluid material and a second fluid material in a material processing system that includes a pipeline. The method includes introducing into an upstream portion of the pipeline a sufficient amount of a material mixing inhibitor using, in some instances a cartridge for delivery of the material mixing inhibitor composition to the material processing system.

13 Claims, 4 Drawing Sheets

(51) Int. Cl.

| | |
|---|---|
| *A23L 29/238* | (2016.01) |
| *A23L 29/244* | (2016.01) |
| *A23L 29/256* | (2016.01) |
| *A23L 29/262* | (2016.01) |
| *A23L 29/269* | (2016.01) |
| *B65D 85/72* | (2006.01) |
| *F15D 1/02* | (2006.01) |

(52) U.S. Cl.
CPC .......... *A23L 29/244* (2016.08); *A23L 29/256* (2016.08); *A23L 29/262* (2016.08); *A23L 29/27* (2016.08); *B65D 85/72* (2013.01); *F15D 1/02* (2013.01); *A23V 2002/00* (2013.01)

(58) Field of Classification Search
CPC ..... A23L 29/256; A23L 29/238; B65D 85/72; F15D 1/02; A23V 2002/00
See application file for complete search history.

(56) References Cited

U.S. PATENT DOCUMENTS

| | | | |
|---|---|---|---|
| 3,209,771 | A | 10/1965 | Gogarty et al. |
| 3,384,512 | A | 5/1968 | Frederick et al. |
| 3,525,426 | A | 8/1970 | Miller |
| 3,532,756 | A | 10/1970 | Prinz et al. |
| 3,565,689 | A | 2/1971 | Lowe et al. |
| 3,883,431 | A | 5/1975 | Ishii et al. |
| 4,003,393 | A | 1/1977 | Jaggard et al. |
| 4,383,783 | A | 5/1983 | Kruka et al. |
| 4,473,408 | A | 9/1984 | Purinton, Jr. |
| 4,543,131 | A | 9/1985 | Purinton, Jr. |
| 4,589,925 | A | 5/1986 | Young |
| 4,610,800 | A | 9/1986 | Durham et al. |
| 4,767,603 | A | 8/1988 | Byrd et al. |
| 4,860,821 | A | 8/1989 | Hagewood |
| 5,060,333 | A | 10/1991 | Bersch |
| 5,215,781 | A * | 6/1993 | Lowther ............... F16L 55/42 134/8 |
| 5,265,303 | A | 11/1993 | Neff |
| 5,300,151 | A | 4/1994 | Lowther |
| 5,300,152 | A | 4/1994 | Lowther |
| 5,346,339 | A | 9/1994 | Himes et al. |
| 5,911,255 | A | 6/1999 | Bond |
| 5,993,562 | A | 11/1999 | Roelofs et al. |
| 6,458,405 | B1 | 10/2002 | Roy et al. |
| 6,485,577 | B1 | 11/2002 | Kiholm |
| 6,685,978 | B1 | 2/2004 | Hauksson |
| 6,841,070 | B2 | 1/2005 | Zha et al. |
| 6,849,581 | B1 | 2/2005 | Thompson et al. |
| 6,916,383 | B2 | 7/2005 | Quarini |
| 6,967,037 | B1 | 11/2005 | Jonsson et al. |
| 7,183,239 | B2 | 2/2007 | Smith et al. |
| 7,485,343 | B1 | 2/2009 | Branson et al. |
| 7,739,767 | B2 | 6/2010 | Galloway |
| 7,930,782 | B2 | 4/2011 | Chen |
| 8,096,358 | B2 | 1/2012 | Rispler et al. |
| 8,273,693 | B2 | 9/2012 | Schwartz |
| 8,528,576 | B2 | 9/2013 | Lohrke |
| 8,741,158 | B2 | 6/2014 | Aytug et al. |
| 9,534,479 | B2 | 1/2017 | Austin et al. |
| 9,636,721 | B2 | 5/2017 | Ovnic et al. |
| 9,650,597 | B2 | 5/2017 | Konya et al. |
| 9,907,324 | B2 | 3/2018 | Johnson |
| 10,030,216 | B2 | 7/2018 | Kane et al. |
| 10,220,424 | B2 | 3/2019 | Ervin |
| 10,302,235 | B2 | 5/2019 | Perstnev et al. |
| 10,646,450 | B2 | 5/2020 | Wooster et al. |
| 11,306,859 | B2 | 4/2022 | Casasnovas et al. |
| 2003/0008054 | A1 | 1/2003 | Gordon et al. |
| 2003/0140994 | A1 | 7/2003 | Kneisl |
| 2005/0233046 | A1 | 10/2005 | Krawczyk et al. |
| 2017/0304880 | A1 * | 10/2017 | Ervin ............... B08B 9/0551 |
| 2018/0020698 | A1 | 1/2018 | Zhu et al. |
| 2018/0281031 | A1 | 10/2018 | Ovnic et al. |
| 2019/0226626 | A1 | 7/2019 | Perstnev et al. |

FOREIGN PATENT DOCUMENTS

| | | |
|---|---|---|
| EP | 0580314 | 1/1994 |
| EP | 1074183 | 2/2001 |
| EP | 1248689 | 4/2006 |
| EP | 2078460 | 7/2009 |
| GB | 30466 | 12/1897 |
| GB | 342808 | 2/1931 |
| GB | 1207770 | 10/1970 |
| GB | 1428615 | 3/1976 |
| GB | 1484562 | 9/1977 |
| GB | 2339876 | 2/2000 |
| GB | 2358229 | 7/2001 |
| JP | 20020210428 | 7/2002 |
| JP | 2018008242 | 1/2018 |
| JP | 2018061951 | 4/2018 |
| KR | 20040011700 | 2/2004 |
| KR | 20090046415 | 5/2009 |
| KR | 20170051940 | 2/2017 |
| RU | 2619682 | 5/2017 |
| WO | 0151224 | 7/2001 |
| WO | 2004000475 | 12/2003 |
| WO | 2010067168 | 6/2010 |
| WO | 2015114319 | 8/2015 |
| WO | 2017023051 | 2/2017 |
| WO | 2012100099 | 7/2017 |
| WO | 2017198684 | 11/2017 |
| WO | 2021029774 | 2/2021 |
| WO | 2022084510 | 4/2022 |

OTHER PUBLICATIONS

Office Action issued in CN Appl. No. 202080015031.8 on Sep. 20, 2022.

International Search Report and Written Opinion issued in PCT/US2021/065328 on Jun. 28, 2022.

Takadono et al., "Treatment of Highly Fouling Waste Waters with Tubular Membrane Systems," Science Direct, vol. 49, Issue 3, pp. 347-355, 2019.

"Superhydrophobic Coating," 2008 R&D 100 Award Entry Form, Sandia National Laboratories, 2008.

Sterritt et al., "Challenges in the Hygenic Application of Pigging Technologies to Maximise Waste Reduction in Food Manufacture," Journal of Hygienic Engineering and Design, 2013 vol. 2 pp. 6-11.

Watkins, "Separation Anxiety: Membrane Cleaning in the $21^{st}$ Century," The American Oil Chemists' Society, 2019.

Guerra et al., "Investigation of Low-Pressure Membrane Performance, Cleaning, and Economics Using a Techno-Economic Modeling Approach," Science and Technology Program Report No. 174, 2012.

Goode et al., "Fouling and Cleaning Studies in the Food and Beverage Industry Classified by Cleaning Type," Comprehensive Reviews in Food Science and Food Safety, vol. 12, pp. 121-143, 2013.

* cited by examiner

METHODS FOR INHIBITING MATERIAL MIXING IN A MATERIAL PROCESSING SYSTEM

The present application is a divisional application of and claims priority to U.S. patent application Ser. No. 17/154,436 filed Jan. 21, 2021, the entire contents of which are incorporated herein by reference.

The present disclosure relates to inhibitor materials and methods for inhibiting or minimizing material mixing in material processing systems. The inhibitor materials may be gel-based materials that may be introduced into a material processing system, directed through all or a portion of the material processing system and then collected from the system. The inhibitor materials inhibit or minimize mixing of material at the leading face of the gel-based material with material at the trailing face of the gel-based material as the gel-based material traverses all or a portion of the material processing system.

BACKGROUND

In material processing systems such as in food processing systems, there is a desire to improve processing yields and to decrease the time required to transition from a material currently being processed to a different material to be processed. These desires are particularly important when the material processing system is subject to production changes, which in some instances may occur once or more than once per day. Further, there is a desire to minimize the environmental impact of waste streams related to blending of the materials during transitions.

At the end of a production batch, when the material processing system switches to another product or at the end of a production run prior to cleaning, the system will typically contain the material that was being processed, which typically holds a tangible financial value and an unwelcome cleaning (clean-in-place, CIP) challenge.

Recovering that material in most instances may be an economic or environmental desire. The unit cost of ingredients may be small; but if there are a thousand liters potentially lost in the system, and several product changes every day, the value of product to be recovered starts to appear as a significant cost. For a marginal product even a small cost saving and increase in yield has the potential to make a substantial impact on profitability.

Depending on the physical layout of the manufacturing site the routing of pipework comprising the material processing system can be quite long, with several hundreds of feet not uncommon. Further, in many situations, the piping of the material processing system may include bends, changes in the effective diameter of fluidly connected pipes, the presence of valves and other equipment that present obstacles in the flow path, with varying flow rates, pressures, and temperatures among other variations.

Accordingly, there is a need for materials and methods that can reduce the time between transitions of a first material and a second material as well as materials and methods that minimize or inhibit mixing of the first material and the second material, which will have an impact on the amount of the first and second material lost to waste.

SUMMARY

The following describes a material mixing inhibitor composition, a method of minimizing material mixing of a first fluid material and a second fluid material in a material processing system that includes a pipeline, and a cartridge for delivery of a material mixing inhibitor composition to the material processing system.

The material mixing inhibitor composition includes from about 50% to about 99% by weight of a liquid, from about 0.5% to about 15% by weight of a gelling agent, and from about 0.05% to about 5% of gelling agent activator. In one aspect, the composition also includes from about 0.1% to about 4% of an oil or fat. In some embodiments, each component of the composition is food grade. As used in this disclosure, the term "food grade" means that the material is safe for human consumption or it is okay to come into direct contact with food products. In one aspect, the material mixing composition and the ingredients comprising the material mixing composition may be considered a processing aid or in other aspects may be considered to be non-toxic to humans.

In one aspect, there is a method of minimizing material mixing of a first fluid material and a second fluid material in a material processing system that includes a pipeline or piping system used for processing food material. The food material may be solid, semi-solid, or liquid. In one embodiment, the piping system is used to process fluid material and may be used to process liquid materials.

Exemplary liquid materials include but are not limited to any suitable food grade liquid. In some aspects, the liquid is the same or similar to the material being processed or to the first fluid material, second fluid material (or any other fluid material that may be present in the material processing system). The liquid may include but is not limited to water, flavored waters, functional waters, carbonated water, cleaning liquids (so long as they are food grade), dairy and non-non-dairy liquids such as soy, almond, coconut, oat, rice, brown rice, cashew, macadamia, peanut, pea, plant protein, hazelnut, banana, walnut, flax, hemp, and quinoa milk, sports and/or energy drinks, electrolyte drinks, soda, plant waters, tree waters, grass waters, bamboo water, coffee, cocoa, tea, beer, distilled liquor, cider, wine, and other consumable beverages.

Material transitions may occur because of the need for periodic cleaning, because the system is required to process a different material than that currently being processed, or because of some other reason. In any event, the piping system may contain a first fluid based material and it is desired to remove the first fluid material from the piping system and replace it with a second fluid material. One of skill will appreciate that an exemplary transition may occur when the system is processing a first fluid material of one type and it is desired to process a second fluid material of a second type. To minimize the amount of the first fluid material or second fluid material that is sent to waste before the entire piping system is filled with the second fluid material, it would be desirable to minimize the amount of mixing between the first fluid material and the second fluid material.

The method of minimizing material mixing of a first fluid material and a second fluid material in a material processing system that includes a pipeline includes introducing into an upstream portion of the pipeline a sufficient amount of a material mixing inhibitor composition to form in the pipeline a self-sustaining plug having its peripheral surface contiguous with an inner surface of the pipeline. A leading face of the plug is in contact with the first fluid material and a trailing face of the plug is in contact with the second fluid material.

The plug is moved through the pipeline under fluid pressure of the second fluid material to a downstream portion of the pipeline where the plug is removed from the system. The removal may be achieved by collecting the plug through an opening in the pipeline, passing the plug through a high shear pump to micronize the plug into particulates, chemical or mechanical removal or disintegration of the plug, or other means of removing the plug from the system.

The plug is effective to minimize or inhibit mixing of the first fluid material and the second fluid material such that an amount of the first fluid material present in the second fluid material at a trailing face of the plug is about 10% or less by volume. In some instances, the plug is effective to minimize or inhibit mixing of the first fluid material and the second fluid material such that an amount of the of the second fluid material present in the first fluid based material at a leading face of the plug is about 10% or less by volume.

Advantageously, mixing of the first fluid material and the second fluid material is inhibited by the plug. In one embodiment, the inhibition of mixing is such that the amount of the first fluid material present in the second fluid material at the trailing face of the plug is about 10% or less by volume or about 9%, 8%, 7%, 6%, 5%, 4%, 3%, 2% or about 1% by volume. In some embodiments, the inhibition of mixing is such that the amount of the second fluid material present in the first fluid material at the leading face of the plug is about 10% or less by volume or about 9%, 8%, 7%, 6%, 5%, 4%, 3%, 2% or about 1% by volume. In other embodiments, the inhibition of mixing is such that the amount of the first fluid material present in the second fluid material at the trailing face of the plug is about 10% or less by volume or about 9%, 8%, 7%, 6%, 5%, 4%, 3%, 2% or about 1% by volume and the amount of the second fluid material present in the first fluid material at the leading face of the plug is about 10% or less by volume or about 9%, 8%, 7%, 6%, 5%, 4%, 3%, 2% or about 1% by volume.

In some embodiments, the material mixing inhibitor composition may be introduced in the following manner. First, prior to introducing the composition, an upstream portion of the pipeline is isolated from the other portions of the pipeline. Then, one or more ingredients forming the material mixing inhibitor composition are introduced to the isolated upstream portion of the pipeline. Thereafter, the isolated portion is opened to the other portions of the pipeline so that the material mixing inhibitor composition may be introduced into the pipeline composition to form in the pipeline a self-sustaining plug having its peripheral surface contiguous with an inner surface of the pipeline.

In other embodiments, the material mixing inhibitor composition is introduced into the pipeline by affixing a cartridge containing the composition to an upstream portion of the pipeline and then dispensing the composition from the cartridge into the pipeline.

The cartridge may have any suitable shape but is typically cylindrical with a first end, a second end spaced from the first end, and a wall disposed between the first and second end and having an interior surface to define an interior of the cartridge. The first end has an outlet configured to be removably attached to a portion of the material processing system. The second end has an inlet is configured to receive the material mixing inhibitor composition. The cartridge has suitable dimensions sufficient to create self-sustaining plug having its peripheral surface contiguous with an inner surface of the pipeline. Generally, the cartridge is sized so that a ratio of the length of the cartridge to its diameter is from about 1:1 to about 10:1. In some embodiments, the first end is inwardly tapered so that outlet has a diameter that is about 10% to about 50% smaller than the diameter of inlet.

As noted above, the first material and/or the second material may be a solid, semi-solid, fluid (gas or liquid), slurry, powder, or any substance that can be conveyed. In addition, the second material may be a solid, semi-solid, fluid (gas or liquid), slurry, powder, or any substance that can be conveyed. In some instances, the first material and the second material are the same type, e.g., both are liquids and both are aqueous-based liquids.

The piping system may have a number of connected pipes that may or may not include bends or other transitions from one end of the piping system to the other end. An example of a transition would be from a smaller diameter pipe to a larger diameter pipe and vice versa. The piping system may include a first pipe with a first effective diameter and a second pipe fluidly connected with the first pipe and having a second effective diameter that may be the same as or different than the effective diameter of the first pipe.

As used in this application, the term "pipe" refers to a structure that is configured to convey substances that can flow—fluids (liquids and gases), slurries, powders or other substances that are sought to be conveyed. Also, the term "pipe" as used in this application includes open structures such as a trough as well as closed structures such as a cylindrical tube. It is contemplated that the term "pipe" refers to a structure having any shape suitable to convey substances that can flow.

As used in this application, "in fluid connection" or "fluidly connected" refers to pipes that are connected in a manner such that if a fluid was present in the pipes, the fluid is able to move through the pipes. One of skill will appreciate that if the material is a solid and it is moved through fluidly connected pipes, the solid would traverse the pipes forming the piping system.

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

In this disclosure, all references to amounts and percentages are by weight unless it is evident that such a reference does not make sense.

BRIEF DESCRIPTION OF THE DRAWINGS

The following description accompanies the drawings, all given by way of non-limiting examples that may be useful to understand how the described process and system may be embodied.

DESCRIPTION

Figure 1:
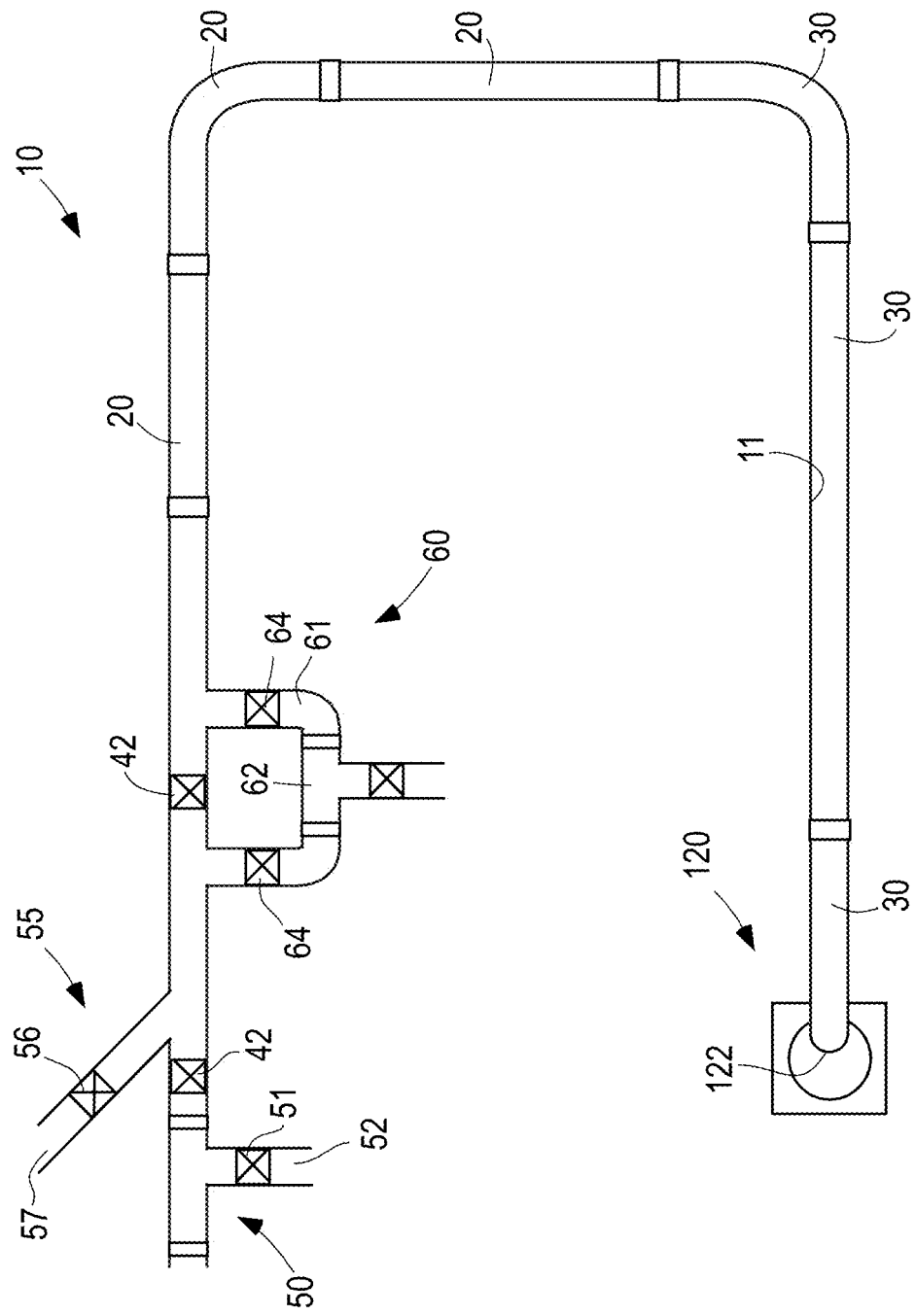
FIG. 1 is a top plan view of an exemplary portion of a piping system that is part of a material processing system and for which the method of this disclosure can be practiced.

The disclosure describes separating plugs that may be provided for use in, for example, material processing systems and in some instances systems used to process fluid materials. Generally, material processing piping systems may be used for material processing and/or may form part of a system used for material processing. The elements or portions of the piping system are typically referred to as pipes, tubes, tube sections, or ducts in this description. The interior surface is referred to as a pipe wall or tube wall. The piping system may be used for a wide variety of materials including but not limited to solids, semi-solids, and liquids such as but not limited to food and non-food-related products such as edible and non-edible food products including meats, pastes, sauces, cereals, vegetables, fruits, dairy, non-dairy drinks like coconut, almond, and soy milk, energy drinks, sports drinks, teas, soft drinks, cosmetics, pharmaceuticals and the like.

Exemplary liquids may include, but art not limited to water, flavored waters, functional waters, carbonated water, cleaning liquids (so long as they are food grade), dairy and non-non-dairy liquids such as soy, almond, coconut, oat, rice, brown rice, cashew, macadamia, peanut, pea, plant protein, hazelnut, banana, walnut, flax, hemp, and quinoa milk, sports and/or energy drinks, electrolyte drinks, soda, plant waters, tree waters, grass waters, bamboo water, coffee, cocoa, tea, beer, distilled liquor, cider, wine, and other consumable beverages.

Generally, the material processing system may be used to process one or more differing types of products and therefore, the material processing system typically needs to be cleaned or flushed before a new material can be processed. The disclosed method advantageously accomplishes the transition between the material being processed and another material such as a cleaning material or another material to be processed while inhibiting the mixing between the materials. As a result, the amount of waste material to landfills and waste processing plants is minimized and, material and cost savings are realized.

The following will first describe a material mixing inhibitor composition that is useful as a self-sustaining plug that can be used to minimize material mixing in a material processing system that includes a pipeline. Then, a method of minimizing material mixing of a first fluid material and a second fluid material in a material processing system that includes a pipeline will be described. Finally, a cartridge useful for delivery of a material mixing inhibitor composition to the material processing system will be described.

Material Mixing Inhibitor Composition

In one aspect, the material mixing inhibitor composition includes from about 50% to about 99% by weight of a liquid, from about 0.5% to about 15% by weight of a gelling agent, and from about 0.05% to about 5% of gelling agent activator. In some aspects, the composition includes from about 0.1% to about 4% of an oil or fat. In some embodiments, each component of the composition is food grade. As used in this disclosure, the term "food grade" means that the material is safe for human consumption.

The liquid may be present in the composition at about 50%, 60%, 70%, 80%, 85%, 86%, 87%, 88%, 89%, 90%, 91%, 92%, 93%, 94%, 95%, 96%, 97%, 98%, or about 99%. In some aspects the liquid may be present in composition from about 50% to about 99%, from about 60% to about 99%, from about 70% to about 99%, from about 80% to about 99%, from about 85% to about 99%, from about 86% to about 99%, from about 87% to about 99%, from about 88% to about 99%, from about 89% to about 99%, from about 90% to about 99%, from about 91% to about 99%, from about 92% to about 99%, from about 93% to about 99%, from about 94% to about 99%, from about 95% to about 99%, from about 96% to about 99%, or from about 97% to about 99%.

The liquid may be any suitable food grade liquid. In some aspects, the liquid is the same or similar to the material being processed. The liquid may include but is not limited to water, flavored waters, functional waters, carbonated water, cleaning liquids (so long as they are food grade), dairy and non-non-dairy liquids such as soy, almond, coconut, oat, rice, brown rice, cashew, macadamia, peanut, pea, plant protein, hazelnut, banana, walnut, flax, hemp, and quinoa milk, sports and/or energy drinks, electrolyte drinks, soda, plant waters, tree waters, grass waters, bamboo water, coffee, cocoa, tea, beer, distilled liquor, cider, wine, and other consumable beverages.

As an example, if the material processing system is used to process orange juice, the liquid may be orange juice. In some embodiments, the liquid is a juice and may in some instances be 100% juice. It will be appreciated that the juice may be any suitable type such as, but not limited to, not-from-concentrate, from concentrate, single strength, concentrates, purees, nectars, and the like.

When the liquid is a juice, the juice may be derived from one or more fruit, vegetable, or a combination of a fruit and vegetable. As an example and without being limited, the juice may be derived from orange, pineapple, apple, mango, cranberry, grapefruit, blueberry, acai, strawberry, grape, passion fruit, tomato, cucumber, kale, spinach, broccoli, carrot, lemons limes, tangerine, mandarin orange, tangelo, pomelo, celery, beets, lettuce, spinach, cabbage, artichoke, broccoli, beet, Brussels sprouts, cauliflower, watercress, peas, beans lentils, asparagus, radish, peach, banana, pear, guava, apricot, watermelon, winter melon, coconut, pomegranate, blackberry, papaya, lychee, plume, prune, fig or a combination thereof.

It is to be noted that the liquid used to form the material mixing inhibitor composition may be the same or different than the first fluid material, the second fluid material, etc. that is used in the material processing system.

The gelling agent may be present in the composition at about 0.5%, 0.75%, 1%, 1.25%, 1.5%, 1.75%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, about 15%, or within ranges that include each of the recited amounts.

The gelling agent may be any suitable known or contemplated gelling agent that is food grade. In some aspects, the gelling agent is selected from the group consisting of natural gums, pectin, agar, cellulose, starch, sodium alginate, potassium alginate, ammonium alginate, calcium alginate, gelatin, collagen, gellan gum, locust bean gum, guar gum, xanthan gum, carrageenan (either or both of iota carrageenan or kappa carrageenan), konjac, and mixtures thereof.

The gelling agent activator is typically added in an amount sufficient to promote or activate the gelling agent (i.e., assist it to form a gel) and may be present in the composition at about 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, 0.5%, 0.6%, 0.7%, 0.8%, 0.9%, 1%, 1.5%, 2%, 2.5%, 3%, 3.5%, 4%, 4.5% or about 5%.

The gelling agent activator will depend on the gelling agent. The gelling agent may include sugar, sugar-like substances, pH modifiers such as acids or bases, sources of anions such as sodium, calcium, potassium, magnesium and mixtures of such anions. When the gelling agent activator is a source of anions that include sodium, calcium, potassium, magnesium or mixtures thereof, they may be provided as a food grade salt in conjunction with a food grade anion that may be selected from acetate, carbonate, chloride, citrate, lactate, phosphate, sulfate and mixtures thereof.

It is contemplated that the gelling agent activator may be intrinsically present in the liquid used to form the material mixing inhibitor composition. For example, juices such as apple juice and orange juice contain calcium, which may be present in a sufficient amount suitable to "activate" the gelling agent. Alternatively or additionally, an extrinsic source of an activating agent such as a source of sodium, calcium, potassium or magnesium may be added to the composition in those instances where the intrinsic source of sodium, calcium, potassium or magnesium may not be sufficient to "activate" the gelling agent.

The oil or fat may be any suitable food grade oil or fat and may be present in the composition at about 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.25%, 2.5%, 2.75%, 3%, 3.25%, 3.5%, 3.75%, or about 4%.

In some embodiments, the oil or fat is a fruit or vegetable oil or fat and in one aspect, the oil or fat is a vegetable oil or fat selected from the group consisting of soybean, corn, palm, cottonseed, canola, rapeseed, sunflower, sesame, grape seed, peanut, rice bran, safflower, linseed, hazelnut, olive, coconut, and mixtures thereof.

In some instances, the vegetable oil is partially or fully hydrogenated. Without being bound by any theory, it is believed that the use of the partially or fully hydrogenated oil or the use of a fat will aid in maintaining the cohesiveness of the formed gel shape and will aid to inhibit ingress of water into the formed gel plug should water be present in either of the first or second fluid material.

The material mixing inhibitor composition may be made by mixing the requisite amounts of the liquid, gelling agent, gelling agent activator, and oil or fat. Generally, it may be useful to mix the ingredients at an elevated temperature such as a temperature in the range of about 70° C. to about 100° C. to promote effective solubilization of each of the ingredients. Thereafter, the composition may be cooled to a temperature within the range of about 1° C. to about 30° C. at which time the composition forms a gel that will assume the shape of the structure into which the composition is placed, e.g., the pipeline of the material processing system, a cartridge used to introduce the gel into the material processing system, as will be described in further detail below, or something else.

The formed gel exhibits a storage modulus in the range from about 2000 to about 7000 over an angular frequency range from about 0.1 to about 500 rad/s. In some aspects the formed gel exhibits a storage modulus that is greater than its loss modulus.

The following tables show exemplary material mixing inhibitor compositions.

Having described the composition that forms a self-sustaining gel, its use to minimize material mixing in a material processing system will now be described.

Method of Minimizing Material Mixing

Referring to FIG. 1, an exemplary schematic of a portion of piping system (which may also be referred to in this description and claims as pipeline) 10 that can be used for material processing and/or that forms part of a system used for material processing is shown. The portion of the piping system 10 can be part of a food or beverage processing facility, a pharmaceutical plant, a chemical plant, or any known type of material processing plant. The piping system 10 is typically used within these facilities to convey product from one location to another. The piping system 10 includes a plurality of individual tube sections or pipes connected together to form a continuous conduit or piping system 10. For example, the piping system may include a plurality of first pipes or tube sections 20 and a plurality of second pipes or tube sections 30 with each of the first pipe sections 20 fluidly connected to each other, with first pipe sections 20 fluidly connected to second pipe sections 30, and with second pipe sections 30 being fluidly connected to each other. One of skill will appreciate that there may be other pipe sections fluidly connected to the second pipe sections 30 (and connected to each other).

The connections or methods of joining individual tube sections or pipes may include external compression clamps, compression couplings, sanitary flanges, or welded joints as well as other methods of joining tube sections. The arrangement of tube sections or pipes 20, 30 shown in FIG. 1 is exemplary and not limiting. The system and method of this disclosure may be used with a wide variety of system configurations including those that only include straight tube sections as well as those that include rises, falls, and turns. In addition, the system and method may be used with different turn radii, different numbers and different configurations of corners, different tubing materials, and different tube lengths.

Generally and in one embodiment, the piping system 10 is made with pipes or tube sections 20, 30 that are cylindrical; however, it is contemplated that the method can be used in piping systems where the pipes or tube sections 20, 30 are not cylindrical but have a shape other than cylindrical. In these instances, the pipes or tube sections 20, 30 may be considered to have an "effective diameter".

The term "effective diameter" refers to a measure such that the area of a non-circular cross section pipe would be approximately the same as the area of a circular cross section pipe. One of skill will appreciate that the "effective diameter" is typically applicable in those instances where the pipe has a non-circular cross section. Further, one of skill will appreciate that, if the pipe has a circular cross section, the "effective diameter" is equal to the diameter of the pipe.

The system and method may be used with pipes or tube sections having the same or different effective diameters. For example, the piping system may include a first pipe or tube section 20 having a first effective diameter 22 (FIG. 2) and a first cross section 24 (FIG. 2) fluidly connected with second pipe or tube section 30 having a second effective diameter. In this instance, the second effective diameter may be smaller than, substantially the same as, the same as, or greater than the first effective diameter 22.

As noted above, FIG. 1 shows only a portion of a piping system 10 that may be used in a material processing system. Other apparatuses such as heat exchangers, pasteurizers, pumps, material inlet and outlet manifolds are not shown since such apparatuses are well known and need not be shown. It is contemplated that such apparatuses may be located within the portion of the piping system 10 that is depicted in FIG. 1 or may be either upstream or downstream of the piping system 10 depicted in FIG. 1. As such, it is contemplated that, in use, the portion of the piping system depicted in FIG. 1 would be used to process a first material 12 and at some time it would be desired to switch to a different material or clean the system, which materials may be referred to as a second material 14. The introduction and removal of the first material 12 and the second material 14 will occur upstream and downstream, respectively, of the portion of the piping system 10 depicted in FIG. 1.

The piping system 10 has as least one upstream portion 40 where the material mixing inhibitor composition that forms, in the piping system, a self-sustaining plug 80 having its peripheral surface contiguous with an inner surface 11 of the piping system is introduced. As will be described, the plug 80 can be introduced into the system 10 at the upstream portion 40 and can be collected and/or removed from the piping system 10 at a downstream portion 70 of the piping system 10. The upstream portion 40 and downstream portion 70 can be located at any suitable location along the piping system 10 and their location can vary and can be at a vertical tube section, a horizontal section, or an angled tube section.

The upstream portion 40 may have one or more valves 42 to isolate the upstream portion 40 from other portions of the piping system 10. It may be useful to isolate the upstream portion 40 from other portions of the piping system 10 when the plug 80 is introduced into the upstream portion 40 of the piping system.

While the plug 80 may be introduced into the upstream portion 40 of the piping system 10 by any suitable manner, FIG. 1 shows three alternative methods. First, the plug 80 may be introduced through a T-shaped piping section 50. The T-shaped piping section 50 may be a "permanent" portion of the piping system 10 and, in this instance it may include a valve 51 to isolate T-shaped piping section 50 from the piping system 10. Alternatively, the T-shaped piping section 50 may be selectively removable such as by forming the T-shaped piping section as its own section to be connected to the piping system 10 in any known suitable manner. In either instance, the T-shaped piping section 50 will have an opening 52 to receive the plug. In one embodiment, the opening 52 will be configured to engage with a cartridge containing the plug 80, as will be described below.

The plug may also be introduced through an angled piping section 55. The angled shaped piping section 55 may be a "permanent" portion of the piping system 10 and, in this instance it may include a valve 56 to isolate angled piping section 55 from the piping system 10. Alternatively, the angled piping section 55 may be selectively removable such as by forming the angled piping section 55 as its own section to be connected to the piping system 10 in any known suitable manner. In either instance, the angled piping section 55 will have an opening 57 to receive the plug. In one embodiment, the opening 57 will be configured to engage with a cartridge containing the plug 80, as will be described below.

It will be appreciated that the angled piping section 55 is at an angle other than orthogonal with respect to the upstream portion of the piping system 10. As an example, if the upstream portion 40 of the piping system is horizontally oriented, the angled piping section 55 has an angled portion that is at an angle greater than 90° and is typically greater than °90 and less than 180°, i.e., it is an obtuse angle.

In another alternative, a bypass loop 60 may be provided at the upstream portion 40 of the piping system. The bypass loop 60 may be provided with one or more bypass valves 64 that are located so that the bypass loop 60 may be isolated from the upstream portion of the piping system.

The bypass loop 60 is configured to introduce the plug 80 into the upstream portion 40 of the piping system 10. The bypass loop 60 may be formed of one or more sections 61 and in one embodiment, it is formed of two sections 61 and 62 with the second section 62 being removable to receive a T-shaped piping section 50 or an angled piping section 55, as described above.

It is contemplated that the plug 80 may be introduced in a manner other than that described above. As one example, it is contemplated to isolate the bypass loop 60 from the upstream portion 40 of the piping system 10 and then to provide each of the ingredients forming the material mixing inhibitor composition to a portion of the bypass loop 60 where the composition will form into a gel in situ. Thereafter, the bypass loop 60 may be opened to or in fluid communication with the upstream portion 40 of the piping system. One of skill will appreciate and understand how the use of valves 42 and/or 64 and their operational sequencing may accomplish the isolation of the bypass loop 60 and the opening of the bypass loop to fluid communication with the upstream portion 40. While the use of a bypass may be expeditious, it may not be necessary and the gel plug may be created in situ in other ways such as by providing each of the ingredients into the piping system 10 at single location where the ingredients will interact with each other to form the self-sustaining plug.

Figure 2:
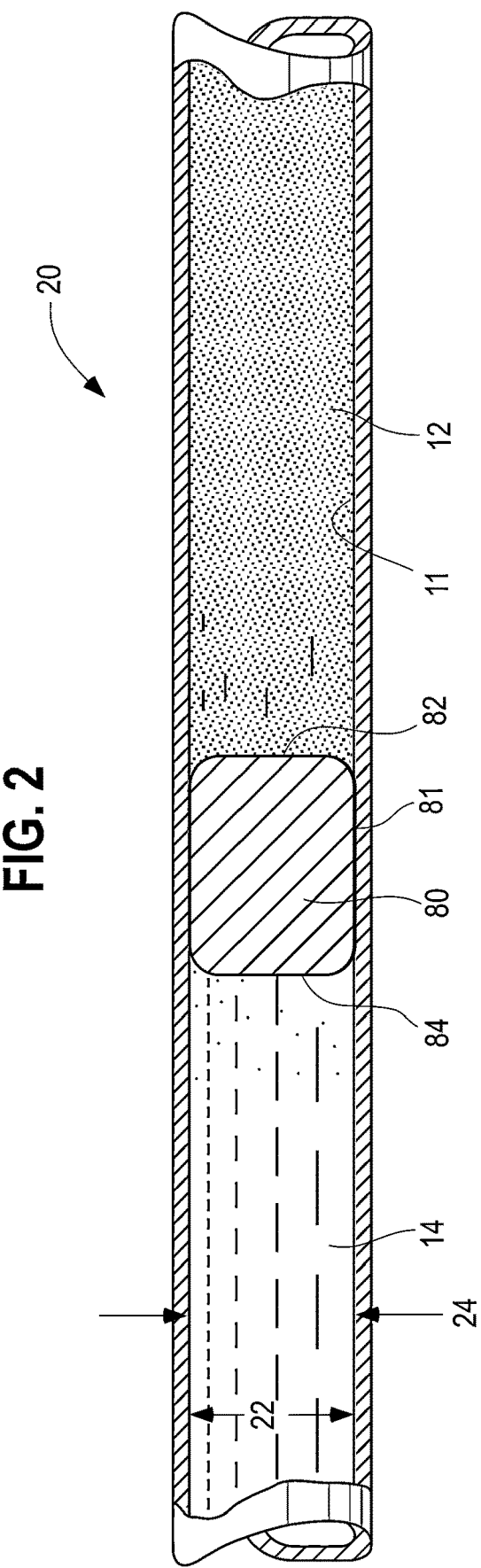
FIG. 2 is a schematic drawing showing a portion of a first section of pipe with a plug.

Turning now to FIG. 2, a section of the piping system 10 is schematically shown. This section is typical of the first pipe section 20 and it shows the material mixing inhibitor composition that has formed, in the pipeline, a self-sustaining plug 80 having its peripheral surface 81 contiguous with an inner surface 11 of the piping system 10. The plug 80 will expand or contract to fill or substantially fill the cross section of the pipe (e.g., the cross section 24 of the first pipe 20 or the cross section of the second pipe 30 (not shown)). Due to the compliancy of the plug 80, the plug 80 may be compressed which may provide an additional outward bias that may aid in maintaining the peripheral surface 81 of the plug 80 against the inner surface 11 of the piping system 10 as the plug moves through the system 10. As a result, when the plug 80 encounters a change in the size of the pipe (e.g., the pipe diameter increases or decreases) or a change in direction of the pipe, due to the compliancy of the plug 80, the plug 80 is able to traverse such changes.

The plug 80 has a leading face 82 and a trailing face 84. The leading face 82 will be in contact with the first material 12 and the trailing face 84 will be in contact with the second material 14. The pressure from the first material 12 being pushed ahead of the plug 80 will act on the leading face 82 of the plug 80 while the pressure of the second material 14 pushing the plug 80 will act on its rear face 84. These opposite acting pressures will also radially-compress the pig along its longitudinal axis to continuously force the peripheral surface 81 of plug 80 into contact with the inner surface 11 of the piping system 10 at all times, even if material should wear off the plug 80. This is true regardless whether the diameter of the plug is smaller, larger, or approximately the same as the diameter of the pipe sections 20 and 30 so that the peripheral surface 81 of the plug 80 will continue to maintain contact with the inner surface 11 of the piping system as the plug 80 moves through the piping system 10.

The defined plug 80 may have any suitable axial length but is typically sufficient to inhibit mixing of the first material 12 and the second material 14. The axial length will be such that the amount of the first material 12 present in the second material 14 at the trailing face 84 is about 10% or less by volume. The axial length will be such that the amount of the second material 14 present in the first material 12 at the leading face 82 is about 10% or less by volume. In some embodiments, the axial length is such that an amount of the first material 12 present in the second material 14 at the trailing face 84 is about 10% or less by volume and such that an amount of the second material 14 present in the first material 12 at the leading face 82 is about 10% or less by volume.

After the plug 80 is introduced into the upstream portion 40 of the piping system 10, the second material 14 is provided so that it is in contact with the trailing face 84 of the plug 80. The second material 14 is moved to cause the plug 80 to move through the piping system 10. Because the second material 14 pushes the plug 80 through the piping system 10, the plug 80 is able to move the first material 12 through the piping system 10 so that the piping system 10 no longer contains the first material 12. Generally, the flow of the second material is laminar.

In some embodiments of the described method, it is contemplated to introduce a second plug (not shown) into the upstream portion 40 of the piping system 10. The second plug may be identical in composition to the first plug and will typically have a leading face and a trailing face such that the leading face is in contact with the second material and the trailing face is in contact with a third material. The third material may be the same as or different from the first material and/or the second material. The second plug is configured such that the amount of the second material present at the trailing face of the second plug is about 10% or less by volume. In some embodiments, the second plug is configured such that the amount of the third material present at the leading face of the second plug is about 10% or less by volume. In other embodiments, the second plug is configured is such that the amount of the second material present at the trailing face of the second plug is about 10% or less by volume and the amount of the third material present at the leading face of the second plug is about 10% or less by volume.

With the above in mind, the method may include introducing a third, fourth, etc. plug into the upstream portion 40 of the piping system 10. Likewise, it is contemplated to provide a third, fourth, etc. material to move the respective third, fourth, etc. plug. In this regard, each material may be the same as or different than the first, second, or any previous material.

The plug 80 and second plug (and each succeeding plug, when present) may be axially separated by a distance that could be as long as the axial distance of the piping system, but will typically be some fraction of that, such as about 75%, about 50%, about 40%, about 30%, about 20%, about 10%, about 9%, about 8%, about 7%, about 6%, about 5%, about 4%, about 3%, about 2%, or about 1%.

The plug 80 and any subsequent plugs are moved through the piping system 10 until they reach a downstream portion 70 of the piping system and a downstream outlet 92 of the piping system 10 where the plug 80 (and any other plugs) are removed from the piping system 10. The removal may be achieved by collecting the plug through an opening in the pipeline, passing the plug through a high shear pump to micronize the plug into particulates, or other means of removing the plug from the system.

While a method has been described that is effective in minimizing material mixing, it is contemplated that the method will be effective to clean the interior surface 11 of the piping system 10. In this regard, one of skill will appreciate that because the plug 80 fills or substantially fills the entire cross-section of the first pipe section 20 and the second pipe section 30 (when present), the peripheral surface 81 of the plug (or plugs, if more than one is present) will be in contact with the inner surface 11 of the first pipe section 20 and the second pipe section 30 (when present). As a result, as the plug 80 is moved through the piping system 10, the inner surface 11 of the first pipe section 20 and the second pipe section 30 (when present) may be "scrubbed" by the plug 80, to effectively clean the inner surface 11 of the first pipe section 20 and the second pipe section 30 (when present).

As noted above a cartridge useful for delivery of a material mixing inhibitor composition to the material processing system may be used to introduce the plug 80 into the upstream portion 40 of the piping system. An exemplary cartridge will now be described with reference to FIG. 3.

Cartridge

Figure 3:
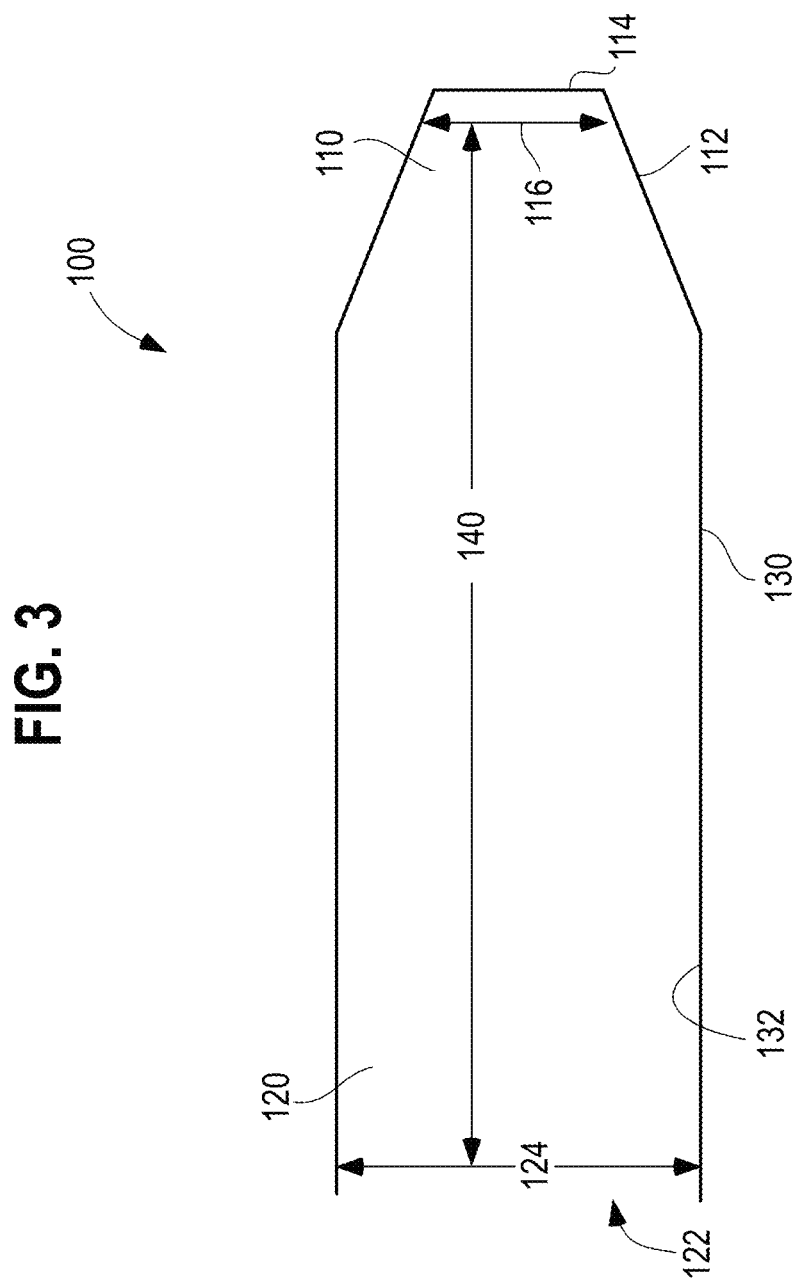
FIG. 3 is a schematic drawing of an exemplary cartridge useful for delivery of a material mixing inhibitor composition to a material processing system.

Referring to FIG. 3, an exemplary cartridge 100 that may be useful for delivering the material mixing inhibitor composition and thus, the plug 80, is shown. The cartridge 100 can be made of any suitable material so long as it is food grade material when it is empty and when it contains the material mixing inhibitor composition. In addition, in some embodiments it may be desired to provide the cartridge 100 when it is empty and when it contains the material mixing inhibitor composition in an aseptic condition.

The cartridge 100 has a first end 110 spaced from a second end 120 and connected by a wall 130 that defines an interior surface 132 of the cartridge 100. The first end 110 is inwardly tapered 112 and terminates in an outlet 114 having a first diameter 116 from which the material mixing inhibitor composition and thus, the plug 80, may be introduced into the upstream portion 40 of the piping system 10. Without being bound by any theory, it is thought that by providing a tapered end that the integrity of the gel plug was improved as compared to a cartridge that does not have a tapered first end. In addition, it appears that the tapered first end minimized initial breakage of the plug 80 when introduced into the upstream portion 40 of the piping system.

The first end 110 may be configured to be attached to an upstream portion 40 of the piping system as described for example with the T-shaped section 50 or the angled section 55. The attachment may be made in any suitable known manner and the attachment may be such that the cartridge is removable or not removable.

The second end 120 has an opening 122 with a second diameter 124 that serves as an inlet to receive the ingredients forming the material mixing inhibitor composition or, if the material mixing inhibitor composition is pre-made to receive the material mixing inhibitor composition. The second diameter 124 is substantially equal to the nominal diameter of the cartridge (i.e., the portion of the cartridge at the first end that is not inwardly tapered). In some instances, the second diameter 124 may be but need not necessarily be the same or substantially the same as the diameter of one or more of the pipe sections 20, 30 of the piping system. Accordingly, the second diameter may be about 1, 2, 3, 4, 5, 6, 7, 8, 9, 10, 11, 12, 13, 14, 15, 16, 17, 18, 19, 20, 21, 22, 23, or about 24 inches.

As noted above, the outlet 114 at the first end 110 has a first diameter 116 that is smaller than the second diameter 124. The first diameter 116 may have a diameter that is about 10% to about 50% less than the second diameter 124, or from about 15% to about 45%, or from about 20% to about 40%, or from about 25% to about 35%, or about 30% less than the second diameter 124.

From the above description, it will be evident that the cartridge 100, and thus, the plug 80 residing within the cartridge 100 may have any suitable length 140. To this end, it may be desirable if the ratio of the length 140 of the cartridge 100 to the second diameter 124 is from about 1:1 to about 10:1, or from about 2:1 to about 8:1, or from about 3:1 to about 6:1.

As noted above, the ingredients forming the material mixing inhibitor composition could be introduced into the cartridge, mixed, and allowed to form the gel plug 80. Alternatively, the ingredients forming the material mixing inhibitor composition could be mixed and then introduced into the cartridge before the composition forms a gel. In either instance, it may be desirable to provide a cap (not shown) that is removably attached to the outlet at the first end of the cartridge to prevent the material mixing inhibitor composition from exiting the cartridge prior to forming a gel.

Example 1

The following Tables provide exemplary formulas for the material mixing inhibitor composition.

TABLE 1

| Ingredients | 1a % wt. | 2a % wt. | 3a % wt. |
|---|---|---|---|
| 100% Apple Juice | 65.0000 | 58.8000 | 59.5000 |
| Apple Pomace | 32.0000 | 29.0000 | 30.0000 |
| Cellulose Gum | 2.8000 | 0.0000 | 2.8000 |
| Alginate | 0.0000 | 4.5000 | 0.0000 |
| Tricalcium Citrate | 0.2000 | 0.2000 | 0.2000 |
| Food Grade Grease | 0.0000 | 7.5000 | 7.5000 |
| | 100.0000 | 100.0000 | 100.0000 |

TABLE 2

| Ingredients | 1b % wt. | 2b % wt. | 3b % wt. |
|---|---|---|---|
| 100% Apple Juice | 64.8000 | 60.3000 | 61.8000 |
| Apple Pomace | 32.0000 | 30.0000 | 31.0000 |
| Cellulose Gun | 3.0000 | 0.0000 | 3.0000 |
| Alginate | 0.0000 | 5.5000 | 0.0000 |
| Tricalcium Citrate | 0.2000 | 0.2000 | 0.2000 |
| Crisco | 0.0000 | 4.0000 | 4.0000 |
| | 100.0000 | 100.0000 | 100.0000 |

TABLE 3

| Ingredients | 1c % wt. | 2c % wt. | 3c % wt. |
|---|---|---|---|
| 100% Apple Juice | 71.8000 | 69.8000 | 69.3000 |
| Apple Pomace | 25.0000 | 25.0000 | 25.0000 |
| Cellulose Gum | 3.0000 | 3.0000 | 3.5000 |
| Alginate | 0.0000 | 0.0000 | 0.0000 |
| Tricalcium Citrate | 0.2000 | 0.2000 | 0.2000 |
| Vegetable Shortening (fat) | 0.0000 | 2.0000 | 2.0000 |
| | 100.0000 | 100.0000 | 100.0000 |

TABLE 4

| Ingredients | 1d % wt. | 2d % wt. | 3d % wt. |
|---|---|---|---|
| 100% Apple Juice | 71.3000 | 70.3000 | 69.3000 |
| Apple Pomace | 25.0000 | 25.0000 | 25.0000 |
| Cellulose Gum | 3.5000 | 3.5000 | 4.5000 |
| Alginate | 0.0000 | 0.0000 | 0.0000 |
| Tricalcium Citrate | 0.2000 | 0.2000 | 0.2000 |
| Vegetable Shortening (fat) | 0.0000 | 1.0000 | 1.0000 |
| | 100.0000 | 100.0000 | 100.0000 |

TABLE 5

| Ingredients | 1E % wt. | 2E % wt. | 3E % wt. | 4E % wt. |
|---|---|---|---|---|
| 100% Apple Juice | 96.8000 | 98.3000 | 98.3000 | 95.8000 |
| Carrageenan | 3.0000 | 0.0000 | 0.0000 | 0.0000 |
| Carrageenan, locust bean gum | 0.0000 | 1.5000 | 0.0000 | 0.0000 |
| Xanthan gum, konjac | 0.0000 | 0.0000 | 1.5000 | 2.0000 |
| Tricalcium Citrate | 0.2000 | 0.2000 | 0.2000 | 0.2000 |
| All vegetable shortening | 0.0000 | 0.0000 | 0.0000 | 2.0000 |
| | 100.0000 | 100.0000 | 100.0000 | 100.0000 |

TABLE 6

| Ingredients | 1F % wt. | 2F % wt. | 3F % wt. | 4F % wt. |
|---|---|---|---|---|
| 100% Apple Juice | 94.8000 | 96.8000 | 96.8000 | 95.8000 |
| Carrageenan | 5.0000 | 0.0000 | 0.0000 | 0.0000 |
| Carrageenan, locust bean gum | 0.0000 | 3.0000 | 0.0000 | 0.0000 |
| Xanthan gum, konjac | 0.0000 | 0.0000 | 3.0000 | 2.0000 |
| Cellulose Gum | 0.0000 | 0.0000 | 0.0000 | 2.0000 |
| Tricalcium Citrate | 0.2000 | 0.2000 | 0.2000 | 0.2000 |
| All vegetable shortening | 0.0000 | 0.0000 | 0.0000 | 0.0000 |
| | 100.0000 | 100.0000 | 100.0000 | 100.0000 |

TABLE 7

| Ingredients | 1 N % wt. | 2 N % wt. | 3 N % wt. | 4 N % wt. | 5 N % wt. |
|---|---|---|---|---|---|
| 100% Apple Juice | 98.9687 | 98.625 | 98.2812 | 92.55 | 93.625 |
| Genugel WR-78 (kappa carrageenan) | 0.75 | 1 | 1.25 | 0 | 0 |
| Genugel Carragennan CJ (sodium iota carrageenan stabilized with sucrose) | 0 | 0 | 0 | 6 | 0 |

TABLE 7-continued

| Ingredients | 1 N % wt. | 2 N % wt. | 3 N % wt. | 4 N % wt. | 5 N % wt. |
|---|---|---|---|---|---|
| Genutine 400-C (carrageenan and locust bean gum) | 0 | 0 | 0 | 0 | 5 |
| Tricalcium Citrate | 0.0563 | 0.075 | 0.0938 | 0.45 | 0.375 |
| All vegetable shortening | 0.225 | 0.3 | 0.375 | 1 | 1 |
|  | 100 | 100 | 100 | 100 | 100 |

TABLE 8

| Ingredients | 6 N % wt. | 7 N % wt. | 8 N % wt. | 9 N % wt. | 10 N % wt. |
|---|---|---|---|---|---|
| 100% Apple Juice | 97.25 | 96.5625 | 95.875 | 96.5625 | 95.875 |
| Gelcarin DG 5720 (a mixture of carrageenan and locust bean gum) | 2 | 2.5 | 3 | 0 | 0 |
| Nutricol GP 6621 (a mixture of xanthan gum and konjac) | 0 | 0 | 0 | 2.5 | 3 |
| Tricalcium Citrate | 0.15 | 0.1875 | 0.225 | 0.1875 | 0.225 |
| All vegetable shortening | 0.6 | 0.75 | 0.9 | 0.75 | 0.9 |
|  | 100 | 100 | 100 | 100 | 100 |

TABLE 9

| Ingredients | 1 Q % wt. | 2 Q % wt. | 3 Q % wt. | 4 Q % wt. | 5 Q % wt. |
|---|---|---|---|---|---|
| 100% Apple Juice | 97.9375 | 97.25 | 95.875 | 88.6 | 88.6 |
| Genugel WR-78 | 1.5 | 2 | 3 | 0 | 0 |
| Genugel Carrageenan CJ | 0 | 0 | 0 | 10 | 0 |
| Genutine 400-C | 0 | 0 | 0 | 0 | 10 |
| Tricalcium Citrate | 0.1125 | 0.15 | 0.225 | 0.4 | 0.4 |
| All vegetable shortening | 0.45 | 0.6 | 0.9 | 1 | 1 |
|  | 100 | 100 | 100 | 100 | 100 |

TABLE 10

| Ingredients | 6 Q % wt. | 7 Q % wt. | 8 Q % wt. | 9 Q % wt. | 10 Q % wt. |
|---|---|---|---|---|---|
| 100% Apple Juice | 95.875 | 94.5 | 93.625 | 92.6 | 91.6 |
| #7. Gelcarin DG 5720 | 3 | 4 | 5 | 0 | 0 |
| #9. Nutricol GP 6621 | 0 | 0 | 0 | 6 | 7 |
| Tricalcium Citrate | 0.225 | 0.3 | 0.375 | 0.4 | 0.4 |
| All vegetable shortening | 0.9 | 1.2 | 1 | 1 | 1 |
|  | 100 | 100 | 100 | 100 | 100 |

TABLE 11

| Ingredients | 1 T % wt. | 2 T % wt. | 3 T % wt. | 4 T % wt. | 5 T % wt. |
|---|---|---|---|---|---|
| 100% Apple Juice | 88.8 | 86.8 | 88.3 | 86.3 | 87.8 |
| Genugel WR-78 | 0 | 0 | 0.5 | 0.5 | 0.5 |
| Genugel Carrageenan CJ | 10 | 12 | 10 | 12 | 10 |
| Genutine 400-C | 0 | 0 | 0 | 0 | 0.5 |
| Tricalcium Citrate | 0.2 | 0.2 | 0.2 | 0.2 | 0.2 |
| All vegetable shortening | 1 | 1 | 1 | 1 | 1 |
|  | 100 | 100 | 100 | 100 | 100 |

TABLE 12

| Ingredients | 6 T % wt. | 7 T % wt. | 8 T % wt. | 9 T % wt. | 10 T % wt. |
|---|---|---|---|---|---|
| 100% Orange Juice | 88.8 | 86.8 | 88.3 | 86.3 | 87.8 |
| Genugel WR-78 | 0 | 0 | 0.5 | 0.5 | 0.5 |
| Genugel Carrageenan CJ | 10 | 12 | 10 | 12 | 10 |
| Genutine 400-C | 0 | 0 | 0 | 0 | 0.5 |
| Tricalcium Citrate | 0.2 | 0.2 | 0.2 | 0.2 | 0.2 |
| All vegetable shortening | 1 | 1 | 1 | 1 | 1 |
|  | 100 | 100 | 100 | 100 | 100 |

TABLE 13

| Ingredients | 1 V % wt. | 2 V % wt. | 3 V % wt. | 4 V % wt. |
|---|---|---|---|---|
| 100% Apple Juice | 90.8 | 88.8 | 86.8 | 88.3 |
| Genugel WR-78 | 0 | 0 | 0 | 0.5 |
| Genugel Carrageenan CJ | 8 | 10 | 12 | 10 |
| Tricalcium Citrate | 0.2 | 0.2 | 0.2 | 0.2 |
| All vegetable shortening | 1 | 1 | 1 | 1 |
|  | 100 | 100 | 100 | 100 |

TABLE 14

| Ingredients | 5 V % wt. | 6 V % wt. | 7 V % wt. | 8 V % wt. |
|---|---|---|---|---|
| 100% Apple Juice | 90.8 | 88.8 | 86.8 | 88.3 |
| Genugel WR-78 | 0 | 0 | 0 | 0.5 |
| Genugel Carrageenan CJ | 8 | 10 | 12 | 10 |
| Tricalcium Citrate | 0.2 | 0.2 | 0.2 | 0.2 |
| All vegetable shortening | 1 | 1 | 1 | 1 |
|  | 100 | 100 | 100 | 100 |

TABLE 15

| Ingredients | 1 X % wt. | 2 X % wt. | 3 X % wt. | 4 X % wt. |
|---|---|---|---|---|
| 100% Apple Juice | 93.8 | 91.8 | 89.8 | 87.8 |
| Genugel Carrageenan CJ | 5 | 7 | 9 | 11 |
| Tricalcium Citrate | 0.2 | 0.2 | 0.2 | 0.2 |
| All vegetable shortening | 1 | 1 | 1 | 1 |
|  | 100 | 100 | 100 | 100 |

TABLE 16

| Ingredients | 5 X % wt. | 6 X % wt. | 7 X % wt. | 8 X % wt. |
|---|---|---|---|---|
| 100% Apple Juice | 93.8 | 91.8 | 89.8 | 87.8 |
| Genugel Carrageenan CJ | 5 | 7 | 9 | 11 |
| Tricalcium Citrate | 0.2 | 0.2 | 0.2 | 0.2 |
| All vegetable shortening | 1 | 1 | 1 | 1 |
|  | 100 | 100 | 100 | 100 |

TABLE 17

| Ingredients | Formula 1CR % wt. | Formula 2CR % wt. |
|---|---|---|
| 100% Apple Juice | 88.8000 | 88.8000 |
| Genugel WR-78 | 0.0000 | 1.0000 |
| Genugel CJ | 10.0000 | 8.0000 |
| Genutine 400-C | 0.0000 | 1.0000 |
| Tricalcium Citrate | 0.2000 | 0.2000 |
| All vegetable shortening | 1.0000 | 1.0000 |
|  | 100.0000 | 100.0000 |

TABLE 18

| Ingredients | PoP 1 % wt. | PoP 2 % wt. | PoP 3 % wt. | PoP 4 % wt. |
|---|---|---|---|---|
| 100% Apple Juice | 90.8000 | 90.8000 | 89.8000 | 90.8000 |
| Genugel Carrageenan CJ | 8.0000 | 8.0000 | 9.0000 | 9.0000 |
| Tricalcium Citrate | 0.2000 | 0.2000 | 0.2000 | 0.2000 |
| All vegetable shortening | 1.0000 | 1.0000 | 1.0000 | 0.0000 |
|  | 100.0000 | 100.0000 | 100.0000 | 100.0000 |

TABLE 19

| Ingredients | PoP 6 % wt. | PoP 7 % wt. | Pop 8 % wt. | PoP 5 % wt. |
|---|---|---|---|---|
| 100% Apple Juice | 88.8000 | 89.8000 | 89.8000 | 91.8000 |
| Genugel Carrageenan CJ | 10.0000 | 9.0000 | 9.0000 | 7.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

TABLE 20

| Ingredients | PoP 9 % wt. | PoP 10 % wt. | PoP 11 % wt. | PoP 12 % wt. |
|---|---|---|---|---|
| 100% Apple Juice | 90.8000 | 89.8000 | 88.8000 | 87.8000 |
| Genugel Carrageenan CJ | 8.0000 | 9.0000 | 10.0000 | 11.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

TABLE 21

| Ingredients | PoP 13 % wt. | PoP 14 % wt. | Pop 15 % wt. | PoP 16 % wt. |
|---|---|---|---|---|
| 100% Apple Juice | 89.8000 | 88.8000 | 88.8000 | 87.8000 |
| Genugel Carrageenan CJ | 9.0000 | 10.0000 | 10.0000 | 11.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

TABLE 22

| Ingredients | PoP 17 % wt. | PoP 18 % wt. | PoP 19 % wt. | PoP 20 % wt. |
|---|---|---|---|---|
| 100% Apple Juice | 88.8000 | 87.8000 | 88.3000 | 86.8000 |
| Genugel Carrageenan CJ | 10.0000 | 11.0000 | 11.0000 | 12.0000 |
| Tricalcium Citrate | 0.2000 | 0.2000 | 0.2000 | 0.2000 |
| All vegetable shortening | 1.0000 | 1.0000 | 0.5000 | 1.0000 |
|  | 100.0000 | 100.0000 | 100.0000 | 100.0000 |

TABLE 23

| Ingredients | PoP 21 % wt. | PoP 22 % wt. | Pop 23 % wt. | PoP 24 % wt. |
|---|---|---|---|---|
| 100% Apple Juice | 88.8000 | 87.8000 | 87.8000 | 86.8000 |
| Genugel Carrageenan CJ | 10.0000 | 11.0000 | 11.0000 | 12.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

TABLE 24

| Ingredients | PoP 25 % wt. | PoP 26 % wt. | PoP 27 % wt. | PoP 28 % wt. |
|---|---|---|---|---|
| 100% Apple Juice | 89.8000 | 88.8000 | 87.8000 | 86.8000 |
| Genugel Carrageenan CJ | 9.0000 | 10.0000 | 11.0000 | 12.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

TABLE 25

| Ingredients | PoP 29 % wt. | PoP 30 % wt. | Pop 31 % wt. | PoP 32 % wt. |
|---|---|---|---|---|
| 100% Apple Juice | 87.8000 | 87.8000 | 87.8000 | 86.8000 |
| Genugel Carrageenan CJ | 11.0000 | 11.0000 | 11.0000 | 12.0000 |
| Tricalcium Citrate | 0.2000 | 0.2000 | 0.2000 | 0.2000 |
| All vegetable shortening | 1.0000 | 1.0000 | 1.0000 | 1.0000 |
|  | 100.0000 | 100.0000 | 100.0000 | 100.0000 |

Example 2

Figure 4:
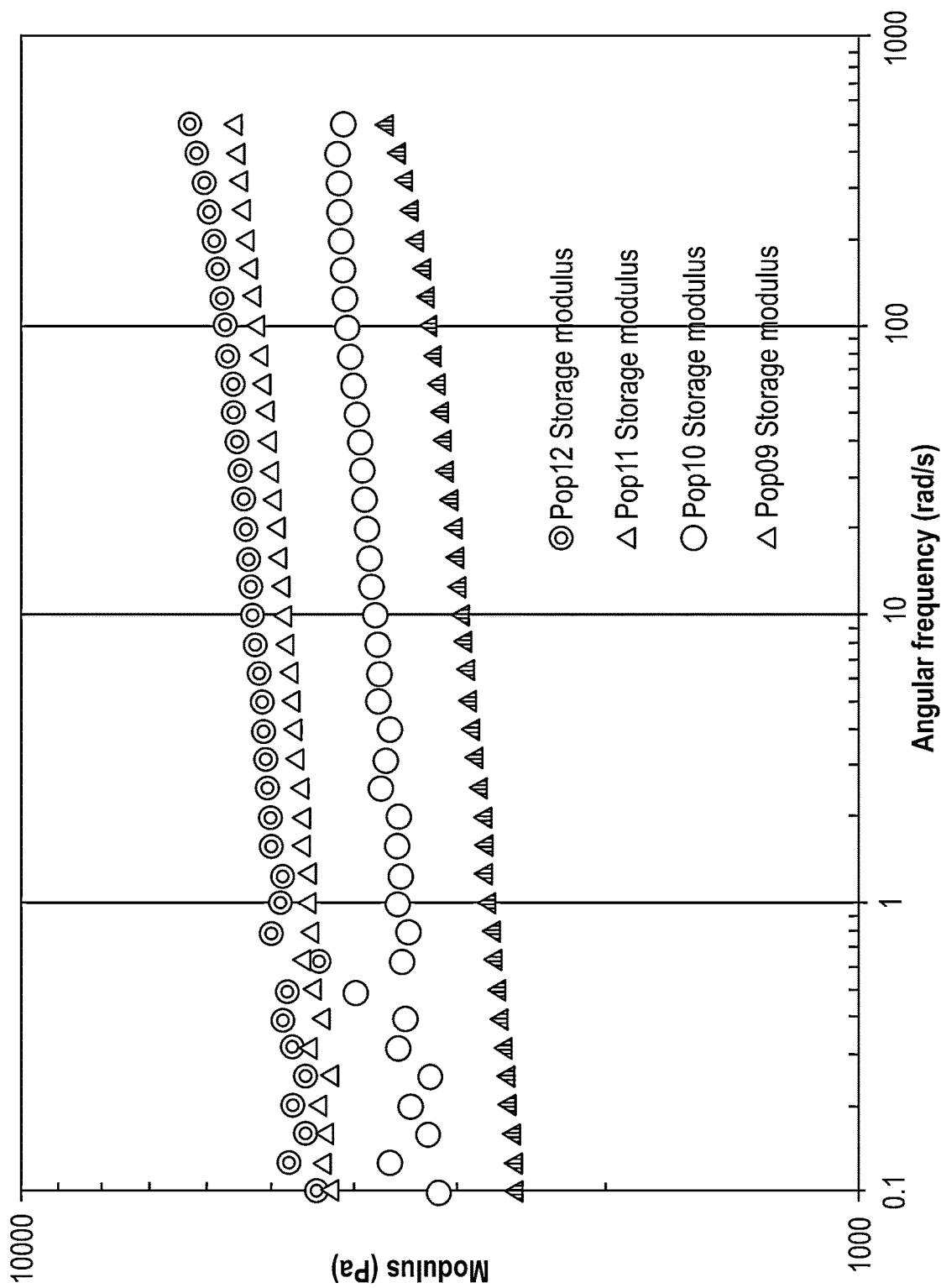
FIG. 4 is a graph of the storage modulus of exemplary material mixing inhibitor compositions.

Exemplary formulas PoP 9-12 (Table 20) were tested to determine their storage modulus and loss modulus. The storage modulus for each is shown in the graph at FIG. 4. It was also found that each of these samples exhibited a significantly greater storage modulus than loss modulus.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A method of minimizing material mixing of a first fluid material and a second fluid material in a material processing system that includes a pipeline, the method comprising:
   introducing into an upstream portion of the pipeline a sufficient amount of a material mixing inhibitor composition to form in the pipeline a self-sustaining plug having its peripheral surface contiguous with an inner surface of the pipeline, a leading face in contact with the first fluid material, and a trailing face in contact with the second fluid material;
   moving the plug through the pipeline under fluid pressure of the second fluid material;
   wherein mixing of the first fluid material and the second fluid material is inhibited by the plug such that an amount of the first fluid material present in the second fluid material at a trailing face of the plug is about 10% or less by volume.

2. The method of claim 1 wherein the inhibition by the plug is such that an amount of the second fluid material present in the first fluid based material at a leading face of the plug is about 10% or less by volume.

3. The method of claim 1 further comprising, prior to the introduction of the material mixing inhibitor composition, removably affixing a cartridge to a portion of the pipeline, the cartridge containing the material mixing inhibitor composition.

4. The method of claim 3 wherein the cartridge is affixed to the portion of the pipeline at an angle other than orthogonal.

5. The method of claim 3 wherein the cartridge and the material mixing inhibitor composition are aseptic.

6. The method of claim 3 wherein the introducing comprises:
   prior to introducing the material mixing inhibitor composition, isolating the upstream portion of the pipeline from other portions of the pipeline; and
   mixing one or more ingredients forming the material mixing inhibitor composition within the isolated upstream portion of the pipeline.

7. The method of claim 1 wherein the material mixing inhibitor composition comprises:
   from about 50% to about 99% by weight of a liquid;
   from about 0.5% to about 15% by weight of a gelling agent;
   from about 0.05% to about 5% of a source of sodium, calcium, or potassium ions; and,
   from about 0.1% to about 4% of a partially or fully hydrogenated oil;
   wherein each component of the composition is food grade.

8. The method of claim 1 wherein a flow of the second material is laminar.

9. The method of claim 1 further comprising removing the plug at a downstream portion of the pipeline, the downstream portion being spaced from the upstream portion.

10. The method of claim 3 wherein the cartridge comprises:
    a first end configured to be removably attached to a portion of the material processing system;
    a second end configured to receive the material mixing inhibitor composition;
    a wall disposed between and connecting the first end and the second end, the wall having an interior surface; and
    wherein a ratio of a length of the cartridge to a diameter of the cartridge is from about 1:1 to about 10:1.

11. The method of claim 10 wherein the first end is inwardly tapered.

12. The method of claim 10 wherein the first end has an outlet with a diameter that is about 10% to about 50% less than the diameter of the cartridge.

13. The method of claim 10 wherein the interior surface is substantially filled with a material mixing inhibitor composition that comprises:
    from about 50% to about 99% by weight of a liquid;
    from about 0.5% to about 15% by weight of a gelling agent;
    from about 0.05% to about 5% of a source of sodium, calcium, or potassium ions; and,
    from about 0.1% to about 4% of a partially or fully hydrogenated oil;
    wherein each component of the composition is food grade.

* * * * *